United States Patent

Hull

[15] 3,682,363

[45] Aug. 8, 1972

[54] INSTANT REPLAY TAPE SYSTEM

[72] Inventor: Harold L. Hull, Carson City, Nev.

[73] Assignee: Diamond Engineering & Development Company, Reno, Nev.

[22] Filed: Oct. 12, 1970

[21] Appl. No.: 79,819

[52] U.S. Cl. ............................226/118, 179/100.2 Z

[51] Int. Cl. ........................B65h 17/42, G11b 15/28

[58] Field of Search............................ 178/DIG. 3; 179/100.2, 100.2 Z; 226/44, 113, 118

[56] References Cited

UNITED STATES PATENTS 3,053,427 9/1962 Wasserman.........179/100.2 Z

*Primary Examiner*—J. Russell Goudeau

*Attorney*—Mellin, Moore & Weissenberger

[57] ABSTRACT

A tape recorder system having separate and independently controllable recording and playback devices with a variable-capacity tape storage between the recording and playback heads and means to position recorded tape accurately at the playback head so as to enable the recorded portion of the tape to be instantly played back upon demand. The system is also capable of re-recording previously recorded material with new material being recorded therewith, and the system is also capable of playing back action in slow motion as the action is occurring.

8 Claims, 4 Drawing Figures

INVENTOR.
HAROLD L. HULL

Mellin, Moore & Weissenberger
ATTORNEYS

INVENTOR.
HAROLD L. HULL
BY
Mellin, Moore & Weissenberger
ATTORNEYS

INSTANT REPLAY TAPE SYSTEM

BACKGROUND OF THE INVENTION

Although the present invention has many uses, it was originally developed for use by musicians who perform live before audiences. Oftentimes a musician would like to play and record a solo passage, and, when the passage is complete, he would like to replay the passage to his audience, and, without missing a beat, play an accompaniment to such passage. An additional effect would then be to go on, again without missing a beat, and replay his duet to the audience while adding yet another live accompaniment thereto. In the same manner, singers could harmonize with themselves.

Conventional reel-to-reel recorders cannot be so used. After the first passage is recorded, the tape has to be rewound to the beginning of the passage. The time lapse involved in this rewind would destroy the effect of a continuous performance sought by the performer. Further, it would be a pure and rare happenstance if the recorded portion and the performer began at the same instant.

Some specialized tape recorders for teaching purposes have been made wherein a portion of tape is recorded and then stored in a random storage bin until it is desired to play the recorded portion back. This solves some of the problems of reel-to-reel recorders, but again such recorders are not satisfactory because they are not capable of playing back the recorded portion upon instant demand. Additionally, such devices, with random storage, often cause tape tangling, tape wear and loss of fidelity because of tape contact with itself.

SUMMARY OF THE INVENTION

In the present system, separate motors and capstans are provided in association with separate recording and playback heads. Two variable-capacity tape storage devices are employed, one being after the recording head and before the playback head and the other being after the playback head and before the recording head. Each tape storage device positively holds the tape stored therein so the tape cannot tangle nor touch itself, and the two storage devices are interconnected so that when one fills, the other empties.

When tape is recorded, the initial portion thereof is moved to the playback head and there stopped so that it can be instantly replayed on demand. After the initial portion is stopped, the remaining portion of the tape that is being recorded is stored in the storage device. When the performer wishes to play back what has been recorded, he presses an appropriate switch and the recorded portion begins to play back immediately, with no lapse between the time the switch is pressed and the time recorded portion begins to play.

Provision is also made so that the recorded portion can be re-recorded as it is being played back, either with no additional signal being recorded therewith or with an additional signal added thereto.

Also by virtue of the present invention, it is possible to continuously record live action, as, for example, a videotape of a football game, and to slow down the action on crucial plays as the action is occurring.

Other objects and advantages will become apparent in the course of the following detailed description.

BRIEF DESCRIPTION OF THE DRAWINGS

In the drawings, wherein like parts are designated by like reference numerals throughout the same.

DESCRIPTION OF THE PREFERRED EMBODIMENT

Figures 1, 2, 3:
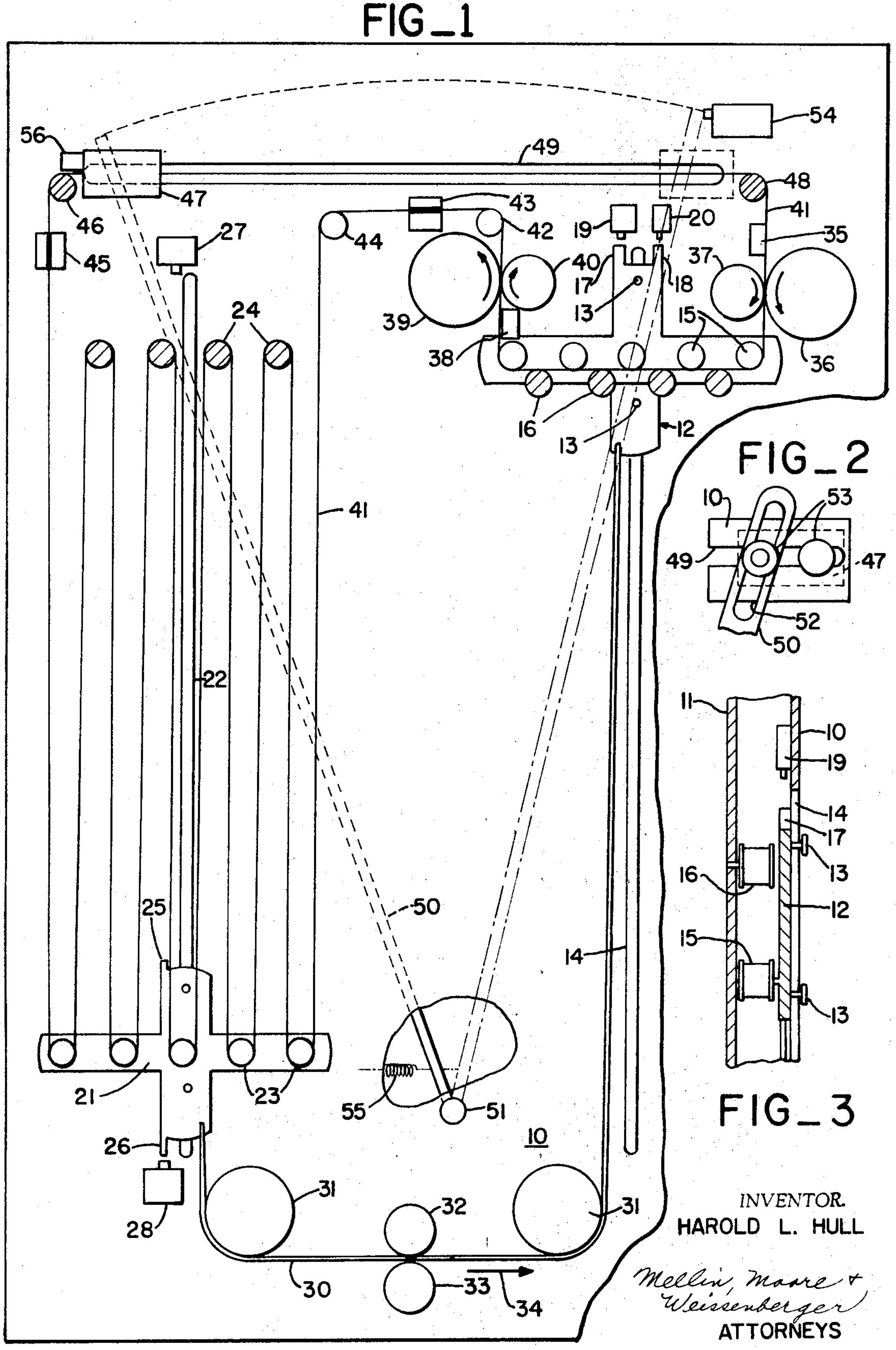
FIG. 1 is an elevational view showing the arrangement of the mechanical components on the main base plate of the tape recorder and player.
FIG. 2 is a sectional detail of the device of FIG. 1, taken on the line 2—2 of FIG. 1.
FIG. 3 is a detail view of a portion of the rear of the main base plate.

Referring now to the drawings, wherein is shown a preferred form of the invention, the tape recording and playing device comprises a main base plate 10 and a cover plate 11 secured together in parallelism by suitable means not shown.

A first cross-shaped carriage member 12 is mounted on base plate 10 by headed pins 13 for sliding movement up and down in base plate slot 14. Carriage member 12 carries thereon a plurality of tape guide rollers 15. A second plurality of tape guide rollers 16 are mounted on the opposed cover plate 11, with the rollers 16 being horizontally staggered relative to carriage rollers 15. Carriage 12 is provided at the upper end thereof with stubs 17 and 18 which engage the switch members of base-plate-mounted microswitches 19 and 20 respectively when the carriage 12 is in its uppermost position on the base plate.

A second cross-shaped carriage member 21 is similarly mounted on base plate 10 for movement up and down in base plate slot 22, and carries thereon tape guide rollers 23 which are horizontally staggered relative to the tape guide rollers 24 mounted on the cover plate 11. Carriage member 21 is provided with upper and lower stubs 25 and 26 for engagement with the switch members of the microswitches 27 and 28 when carriage 21 is in its upper or lower limit positions respectively.

A flexible cable 30 is connected to the bottom of carriage 12, trained around base-plate-mounted idle roller 31, and connected to the bottom of carriage 21. The cable 30 passes between drive roller 32 and pinch capstan 33. When the latter are energized, the cable will be pinched and driven in the direction indicated by arrow 34.

A conventional erase-recording head 35 is fixed to the base plate 10 immediately before the record drive roller 36 and record capstan 37, and a conventional playback head 38 is mounted on the base plate immediately before the playback drive roller 39 and playback capstan 40.

An endless loop of magnetic tape 41 is trained, as shown in FIG. 1, past the erase-recording head 35, between the record roller and capstan 36 and 37, through the carriage and cover mounted rollers 15 and 16, past the playback head 38, between the playback roller and capstan 39 and 40, around idler roller 42, through tape clamp 43, around idler roller 44, around the carriage and cover mounted rollers 23 and 24, through tape clamp 45, around idler roller 46, through tape clamp 47, and around idler roller 48 back to the erase-recording head 35. The idler rollers 42, 44, 46 and 48 are all mounted on the base plate 10. The tape clamps 43 and 45 are also mounted on base plate 10 and will clamp the tape against movement therethrough when the clamps are electrically energized, while allowing the tape to pass therethrough when deenergized. Tape clamp 47 is mounted on the base plate 10 for horizontal movement in slot 49, and, like clamps 43 and 45, will clamp onto the tape when the clamp is electrically energized.

Lever 50, pivotally mounted at 51 to base plate 10, has a slot 52 at its upper end through which one of the guide pins 53 of tape clamp 47 passes. Movement of the tape clamp 47 to the right (FIG. 1) will rotate lever 50 about its pivot point 51, and carry the upper end of the lever into engagement with the switch member of microswitch 54. This latter switch is adjustably mounted on base plate 11 so that the amount of rotation of lever 50 required to actuate switch 54 may be adjusted. Lever 50 is biased by spring 55 to return the lever and tape clamp back against the stop member 56 fixed to the base plate.

Figure 4:
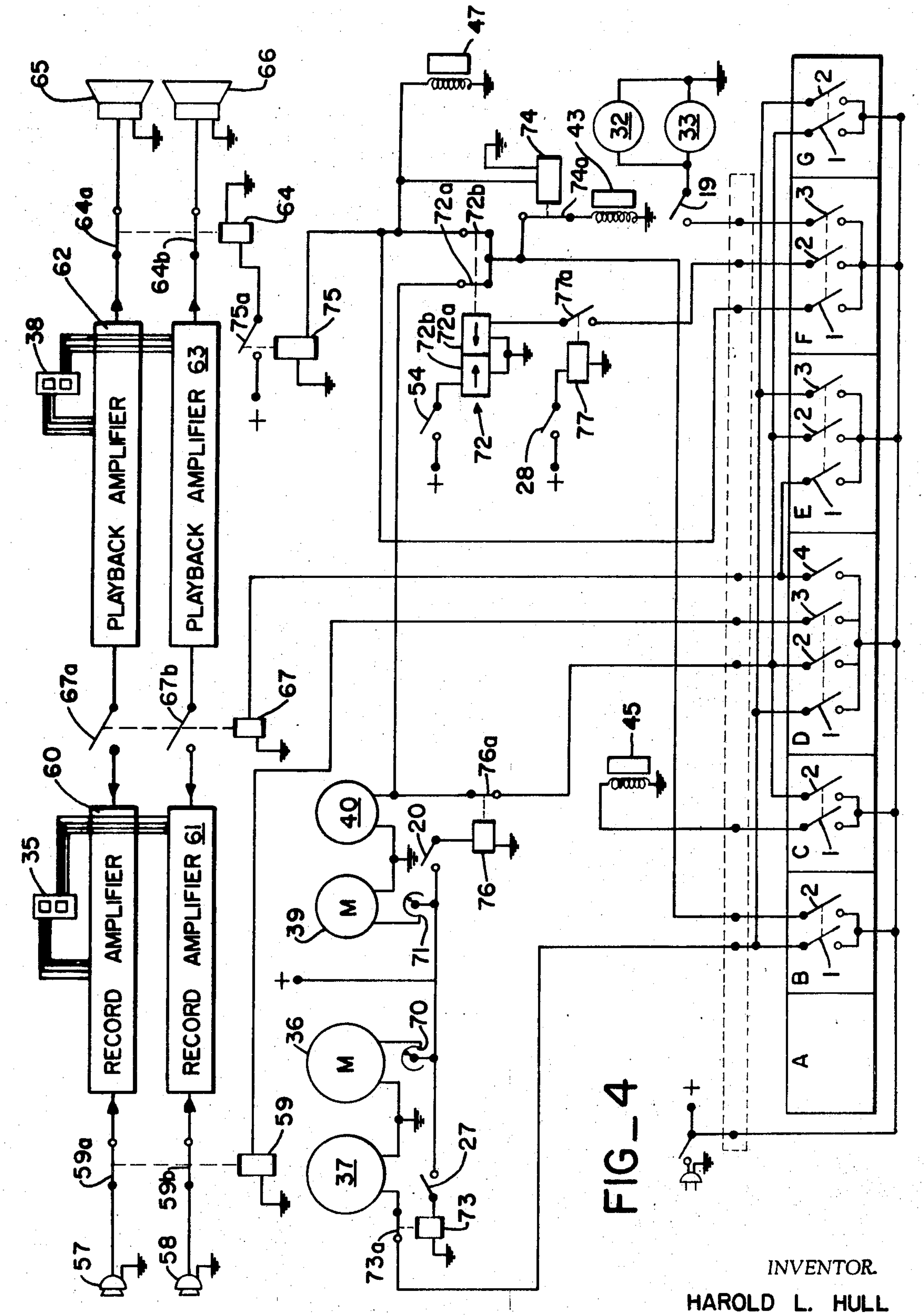
FIG. 4 is an electrical diagram of the device of FIG. 1.

The electrical diagram of the device is shown in FIG. 4. For purposes of simplicity, the various motors driving the drive rollers 32, 36 and 39 have been given the same reference numerals as the respective rollers, and the apparatus for moving the capstans 37 and 40 into engagement with their drive rollers have been given the same reference numerals as the capstans, respectively. In FIG. 4, all switches are shown in their normal, or de-energized, positions. The mode keys A through G are of the conventional type wherein, if any one key is depressed, it will latch mechanically into closed position and close the mode switches associated therewith. A depression of any other mode key will automatically unlatch a previously latched key and open the mode switches associated therewith, while latching the newly depressed key and closing its mode switches.

The electrical system includes two microphones, 57 and 58, feeding separately through normally closed contacts 59*a* and 59*b* of relay 59 to the twin record amplifiers 60 and 61 which feed the amplified inputs to the recording head 35. The playback head 38 feeds the signals from the tape to the twin playback amplifiers 62 and 63, the outputs of which are connected through the normally closed contacts 64*a* and 64*b* of relay 64 to the twin speakers 65 and 66. As shown, the system is arranged for eight-track stereo operation, although a monaural system or a different number of tracks may be used if desired. The playback amplifiers 62 and 63 also have outputs, adapted to be fed back through the normally open contacts 67*a* and 67*b* of relay 67 to the record amplifiers so that the playback signals may be re-recorded when desired.

With the plug 68 connected to a suitable power supply and the main "off-on" switch 69 closed, power will be supplied to all of the normally open switches of the mode switches B through G. Power will also be supplied to all of the points on the diagram indicated by the + symbol. As, for example, closure of main switch 69 will continuously energize the record and playback drive rollers 36 and 39. These two drive rollers each have a speed control rheostat 70 and 71 connected in series therewith so that the record speed and playback speed may be independently varied as desired. Preferably, the rheostats 70 and 71 will have indicia thereon so that the record and playback speed can be easily set to the various conventional tape speeds, such as 1⅞, 3¼, 7½ or 15 inches per second.

Differential relay 72 is a bistable relay. When relay section 72A is energized, even momentarily, the relay contacts 72*a* and 72*b* will move and stay in closed position. These contacts will remain closed, until such time as relay section 72B is energized, even momentarily, at which time the contacts 72*a* and 72*b* will shift to open position, and will remain open until such time as relay section 72A is again energized.

MODE A

Mode A key is used to unlatch any of the other mode keys B through G which may be depressed and will open any of the mode switches that have been closed by the other mode keys. Mode A key has no switches operated thereby.

MODE B — RECORD ONLY

Depression of the Mode B key will close the normally open switches B1 and B2. The record capstan 37 will be energized through switch B1 and normally closed contacts 73*a* of relay 73 so that the tape will be driven past the recording head 35. At the same time the playback capstan 40 will be energized through switch B2, and contacts 72*a* of relay 72. Also, tape clamp 47 is energized through contacts 72*b* so that clamp 47 clamps onto tape 41 for movement therewith. Relay 74 is also energized through contacts 72*b* to open relay contacts 74*a* and thereby prevent tape clamp 43 from being energized. Finally, relay 75 is energized through contacts 72*b*. Relay 75 closes the normally open contacts 75*a*, to energize relay 64 and open the normally closed contacts 64*a* and 64*b* to disconnect speakers 65 and 66.

The tape is now driven past the recording head 35 and is recorded. At the same time, the tape clamp 47 moves therewith, rotating lever 50 until it engages microswitch 54 to close its normally open switch. This energizes relay 72B, shifting contacts 72*a* and 72*b* to open position. The opening of contacts 72a de-energizes playback capstan 40, stopping the recorded tape at the playback head 35. The microswitch 54 is adjustably mounted on the base plate 10 so that the beginning of the recorded tape can be accurately stopped at the playback head, ready for instant playback when the playback capstan is later energized.

The opening of contacts 72b (in response to the closure of limit switch 54) de-energizes the tape clamp 47 which is returned by spring 55 to its original position at stop member 56.

Relay 75 is also de-energized, de-energizing relay 64 and reconnecting the playback amplifiers to the speakers 65 and 66.

Relay 74 is also de-energized, and its contacts 74*a* close to energize the tape clamp 43.

With the record capstan 37 energized and the tape clamped by clamp 43, the tape will cause carriage 21 to be pulled upwardly, decreasing the length of tape trained around rollers 23 and 24. Since carriages 21 and 12 are interconnected by cable 30, upward movement of carriage 21 will cause a corresponding and equal amount of downward movement of carriage 12. Thus, with the tape clamped at 43, the variable-capacity tape storage apparatus defined by rollers 23 and 24 will decrease and the variable-capacity tape storage apparatus defined by rollers 15 and 16 will increase.

This action will continue, with the tape being recorded and positioned for instant playback, until another mode key is depressed, or until the carriage 9 reaches its upper limit, i.e., when the tape in this variable-capacity storage apparatus is used up.

If carriage 9 reaches its upper position, normally open microswitch 27 closes, energizing relay 73 to open contacts 73*a* and de-energize the record capstan 37.

MODE C — INSTANT REPLAY

Assuming that Mode B has been used to record a desired duration of input signals, the Mode C key is depressed. The resultant opening of the Mode B switches de-energizes tape clamp 43.

Mode C switch C2 energizes the play capstan 40 through the normally closed contacts 76a of relay 76 so that the initial part of the previously recorded tape is immediately played back. This is of particular advantage when the system is being used by a musical performer, since it allows him to record a passage and then switch to Mode C and have the passage instantly played back, so that he may plan a duet with himself without missing a beat.

Mode C switch C1 energizes tape clamp 45 so that no tape can enter the variable-capacity tape storage apparatus 15 and 16. Thus, as the tape is played by playback head 38, the tape pulls up on carriage 12 which, through cable 30, pulls carriage 21 downwardly to accommodate the tape filling back into the variable tape storage apparatus 23, 24.

If carriage 12 moves back to its original upward position, microswitch 20 closes, energizing relay 76 to open contacts 76*a* and de-energize the playback capstan 40.

If at any time during playback it is desired to stop playback and add a further recorded passage on the tape, the B Mode key is again depressed. The C Mode key is released, cutting out the playback capstan, since the C Mode switch C2 is now open. The bistable relay 72 is still in a position such that contact 72*a* is open and thus the B Mode switch B2 cannot energize the playback capstan. The B Mode switch B1 energizes the record capstan 37 through the normally closed contacts 73a and the tape will be pulled past the recording head 35. Opening of the C1 switch de-energizes tape clamp 45 and closing of the B2 switch energizes tape clamp 43.

Switching back to the C Mode allows the tape stored between rollers 15 and 16 to again be played, without any break, or silent spot, between the first recorded portion and the second recorded portion.

MODE D — REPEATED PLAYBACK K

This mode is used whenever a user wishes to hear a recorded phrase played repeatedly so that it may be studied or so that a performer may practice with or against such phrase. First of all, the Mode B key is depressed and the phrase is recorded on the tape.

The performer may then press the D Mode key. The now closed contacts D3 energize relay 59 to open the normally closed switches 59*a* and 59*b* and disconnect the microphones from the record amplifier inputs. Switch D4 energizes relay 67 to close switches 67*a* and 67*b* to feed the outputs of the playback amplifiers back to the record amplifiers.

Mode switch D1 energizes the record capstan 37 and switch D2 energizes the playback capstan 40. Neither of the tape clamps 43 or 45 is energized.

As a result, the tape passing the playback head 38 will be read and re-recorded on the tape by the recording head 35, and the originally recorded passage will be repeatedly played as long as the D Mode key is latched down. In this mode, as in all modes, the tape is erased by the erase-recording head 35 before it is recorded.

Since neither tape clamp 43 nor 45 is energized, and since the tape passes the record and playback heads at the same speed, the carriages 12 and 21 do not move, the rollers 15 and 16 remaining the proper distance apart to accommodate the length of the passage originally recorded and repeated.

MODE E — SOUND ON SOUND

In many instances a performer will wish to record a passage, play it back, play a duet with the recorded passage and record the duet.

Again, the performer uses the Mode B to record the original passage, with the start thereof being positioned for instant replay. On the down beat, the performer presses the Mode E key.

Mode switch E1 energizes relay 67 to connect the outputs of the playback amplifiers to the inputs of the record amplifiers. Relay 59 is not energized, and the microphones remain connected to the inputs of the record amplifiers. Mode switch E2 energizes the playback capstan through the normally open contacts 76*a* of relay 76 and mode switch E3 energizes the record capstan 37 through the normally closed contacts 73*a* of relay 73.

In this manner the originally recorded passage will be re-recorded, together with the added portion played by the performer.

The performer may then leave the Mode E key down and add another portion thereto, or he may switch back to Mode A for a solo performance by himself or to another mode for its capabilities.

MODE F — CLEAR

If at some time, the performer wishes to clear the accumulated tape from the rollers 15 and 16 and restore the carriages 12 and 21 to their original positions, he simply presses the Mode F key.

The mode switch F1 energizes relay 75, closing contacts 75a to energize relay 64 and open contacts 64a and 64b to disconnect the speakers.

Mode switch F3 energizes the cable drive roller and capstans 32 and 33 to drive cable 30 in the direction indicated by arrow 34. This pulls carriage 21 downwardly, increasing the amount of tape between rollers 23 and 24 and thus pulls carriage 12 upwardly. When carriage 12 reaches its original upper position, microswitch 19 is opened to de-energize the cable drive roller and capstans 32 and 33.

The return of carriage 21 to its original downward position closes microswitch 28, energizing relay 77 to close its normally open contacts 77a. A circuit is now complete from mode switch F2 through contacts 77a to relay portion 72A, which causes the contacts 72*a* and 72*b* to return to their closed position.

MODE G — RECORD AND PLAYBACK

This mode has several advantages for radio and television applications.

For example, in conducting live interviews on radio or television, it is often desirable to have the ability to delete certain portions of the interview which might be considered as libelous or otherwise offensive. However, if the interview is broadcast immediately, it is not always possible to catch unwise utterances. With the present device, it is a simple matter to provide a time delay between utterance and broadcast.

The Mode B key is depressed, preferably with the microphones covered or otherwise disabled, for whatever period of time delay is desired. If a one-second delay were desired, the Mode B switch would be depressed for one second. A ten-second delay would require the Mode B switch to be depressed for that time. During this time, the carriage 12 would move down to store tape between the rollers 15 and 16.

The Mode G key is then depressed, and mode switches G1 and G2 would energize the playback and record capstans 37 and 40 respectively. The recorded tape would be delayed, by the desired and constant time factor, before it reaches the playback head 35 so that there is sufficient time for any corrective measures to be taken if any of the recorded matter should be censored before it is broadcast.

Mode G also has a unique advantage in video reporting of sports. At present, many broadcasters employ what is termed an "instant replay," wherein after a play has been carried out, it is replayed with the motion slowed down at the crucial point. Such procedure requires a television camera trained on the action during a play with the play being taped. After the play is complete, the tape is reversed, and the beginning of the play is found on a monitor. The tape is then run forwardly and slowed at the appropriate time.

The present device allows crucial moments to be played in slow motion, not after the play is complete, but during the play itself. Mode G is employed, which allows the tape to be continuously recorded at the record head 6 and played back (for transmission to the public) as soon as the tape reaches the playback head 38. With the carriage 12 at the top, the delay between recording and playback would be sufficiently short not to interfere with the commentator's description of the action. If the action occurring appears of sufficient import to warrant a slow-motion playback, the operator merely slows down the playback capstan by a suitable adjustment of potentiometer 71 so that the tape speed past the playback head is reduced for a slow-motion effect as the play is in progress. The play is still being recorded, at normal speed, by the recording head 35. The differential in speed of the playback and record capstans causes the carriages 21 and 12 to move up and down respectively, so that the recorded tape is stored between rollers 15 and 16.

At the end of the play, the operator merely switches to another camera and presses the clear Mode F key to restore the tape carriages 12 and 21 to their original positions. Rheostat 71 is also returned to its original position.

The various relays, motors, solenoids and amplifiers described above may be mounted on the back side of the main base plate 10 if desired. The mode keys A through G may be mounted on the case in which the apparatus is housed. Preferably, a duplicate set of mode keys, connected in parallel with those shown in FIG. 4, should be provided for foot operation by a performer so that he can utilize the apparatus while using both hands in playing his instrument.

As may be seen by the foregoing, the present device is extremely flexible in operation. The use of the movable carriages with the tape trained around fixed and movable rollers prevents tape tangling as is often encountered in random storage tape bins. Also, the tape never touches itself, thereby preventing mixing of signals on the tape and increasing the fidelity thereof. The tape is not pulled across the record or playback heads at high speeds as are encountered in reel-to-reel systems.

Having thus described my invention, I claim:

1. A tape recording device comprising:

a. a recording head;

b. a playback head separated therefrom;

c. a recording tape mounted for movement past said recording and playback heads;

d. first drive means for moving said tape past said recording head when said first drive means is energized;

e. second drive means for moving said tape past said playback head when said second drive means is energized;

f. first switch-operated means for simultaneously energizing said first and second drive means and for substantially de-energizing said second drive means when the portion of said tape initially at said recording head when said first drive means was energized has been moved to and positioned at said playback head;

g. a variable-capacity tape storage means in the path of said tape between said recording and playback heads for the reception and storage of said tape that is driven past the recording head by said first drive means when said second drive means is de-energized.

2. A tape recording device as set forth in claim 1 and further including:

h. second switch-operated means for energizing said second drive means at a desired time subsequent to the actuation of said first switch-operated means.

3. A tape recording device as set forth in claim 2 wherein said second switch-operated means also de-energizes said first drive means.

4. A tape recording device as set forth in claim 2 wherein said second switch-operated means continues the energization of said first drive means.

5. A tape recording device as set forth in claim 4, and further including:

i. means to vary the speed of said second drive means relative to the speed of said first drive means.

6. A tape recording device as set forth in claim 4 and further including:

i. means operable in response to operation of said second switch-operated means for reading the signal on said tape at said playback head and for simultaneously recording such signal on said tape at said recording head.

7. A tape recording device as set forth in claim 6 and further including:

j. means operable in response to operation of said second switch-operated means for recording an external signal on said tape at said recording head.

8. A tape recording device comprising:

a. a recording head;

b. a playback head separated therefrom;

c. a recording tape mounted for movement past said recording and playback heads;

d. first drive means selectively energizable to move said tape past said recording head;

e. second drive means selectively energizable to move said tape past said playback head;

f. a variable-capacity tape storage means in the path of said tape between said recording and playback heads for the reception and storage of tape when said first drive means is energized and said second drive means is de-energized;

g. means to energize both of said drive means to move said tape simultaneously past both of said recording and playback heads;

h. means responsive to a predetermined amount of movement of said tape past said recording head for de-energizing said second drive means and for holding said tape against movement past said playback head.

* * * * *